United States Patent [19]

Fujii et al.

[11] Patent Number: 5,483,805
[45] Date of Patent: Jan. 16, 1996

[54] CONTROL APPARATUS FOR AN AIR CONDITIONING SYSTEM FOR AN ELECTRIC VEHICLE

[75] Inventors: Kazuo Fujii; Isao Takahashi, both of Konan; Junichiro Hara, Yokohama; Takayoshi Matsuoka, Tokyo, all of Japan

[73] Assignees: Nissan Motor Co., Ltd., Kanagawa; Zexel Corporation, Tokyo, both of Japan

[21] Appl. No.: 357,194

[22] Filed: Dec. 13, 1994

[30] Foreign Application Priority Data

Dec. 16, 1993 [JP] Japan .................................. 5-343671

[51] Int. Cl.$^6$ ........................... G05D 23/32; F25D 29/00
[52] U.S. Cl. ................. 62/158; 62/161; 62/228.4
[58] Field of Search .............................. 62/158, 161, 228, 62/4, 324, 6, 90, 173

[56] References Cited

U.S. PATENT DOCUMENTS 5,299,431  4/1994  Iritani et al. ............................... 62/243
5,341,868  8/1994  Nakata ...................................... 62/161

*Primary Examiner*—William E. Wayner
*Attorney, Agent, or Firm*—Wenderoth, Lind & Ponack

[57] ABSTRACT

In order to provide a control apparatus for an air conditioning system for an electric vehicle which achieves smooth switching of operating modes, a decision is made as to whether or not the operating mode set by a means for air conditioning mode setting has been maintained for a specific length of time and also, a decision is made by a means for compressor rotation rate decision making as to whether or not the actual rotation rate of the compressor is at the minimum rotation rate. With this, if the operating mode set by the means for air conditioning mode setting has not been maintained for the specific length of time, or, if the operating mode has been maintained for the specific length of time but the actual rotation rate of the compressor is not at the minimum, the rotation rate of the compressor is set at the minimum rate by a means for shift mode setting so that the operating mode is switched only when the operating mode set by the means for air conditioning mode setting has been maintained for the specific length of time and the actual rotation rate of the compressor is at the minimum rate, and the compressor is controlled based upon the air conditioning level set by the means for air conditioning mode setting.

15 Claims, 5 Drawing Sheets

CONTROL APPARATUS FOR AN AIR CONDITIONING SYSTEM FOR AN ELECTRIC VEHICLE

BACKGROUND OF THE INVENTION

1. Field of the Invention

The present invention relates to a control apparatus for an air conditioning system for an electric vehicle which is provided with a cooling / heating cycle that is capable of constituting a cooling cycle and a heating cycle by switching coolant passages.

2. Description of the Related Art

To cite examples of air conditioning systems in the prior art, the air conditioning system disclosed in Japanese Unexamined Patent Publication S59-49439 and Japanese Examined Patent Publication S62-18484 both disclose a heat pump type air conditioning system. Also, in recent years, a system has been disclosed that is provided with a sub condenser downstream of the cooling unit in the air conditioning duct and in which, by switching a three-way valve provided on the intake side of the main condenser, coolant that has flowed out of the compressor is circulated in the following order during cooling operation: from the main condenser to the sub condenser to the cooling unit and finally to the compressor. During heating operation, coolant bypasses the main condenser and so is circulated from the sub condenser to the cooing unit and then to the compressor in that order.

This means that in this system, the coolant discharged from the compressor releases heat into the air and becomes liquefied while it passes through the main condenser during cooling operation. As a result, the coolant that passes through the sub condenser is at a low temperature and the heating quantity by the sub condenser is reduced. Also, in this system, the mixing door fully closes off the front sur face of the sub condenser in order to reduce its effect on the air that passes through the air conditioning duct and air that has been cooled at the evaporator is discharged directly into the cabin.

Now, during heating operation, the coolant discharged from the compressor bypasses the main condenser and is supplied to the sub condenser where it releases heat to the air that passes through. This air is at a low temperature, since its heat has been absorbed as it passed through the evaporator, but the heating performed by the sub condenser is greater than the absorption by the evaporator by the amount of work done by the compressor. Overall, therefore, the air inside the air conditioning duct is heated.

In the air conditioning system for an electric vehicle that has been explained so far, the temperature control lever for setting the air conditioning mode is usually a slide switch that is provided with, for example, a cooling operation zone on the left side, a heating operation zone on the right side and a ventilation zone in the middle. Because of this, when the air conditioning mode is switched from, for example, heating operation to cooling operation, or from cooling operation to heating operation, the slide switch passes through the ventilation operation zone, briefly setting the air conditioning mode to the ventilation mode. As a result, the compressor is turned off, and due to the forcible stop control which is set to prevent a differential pressure activation, it remains off for a specific length of time (normally 3 minutes), generating a temperature difference between the air discharged before the compressor is turned off and the air discharged when the compressor is restarted after it has been off. This presents a problem in that smooth switching of the air conditioning mode is prevented.

SUMMARY OF THE INVENTION

Accordingly, the object of the present invention is to provide a control apparatus for an air conditioning system for an electric vehicle which achieves smooth switching of the operating mode.

The following, in reference to FIG. 1, explains the present invention in an air conditioning system for an electric vehicle provided with a heat exchanger within the air conditioning duct and in which a cooling cycle and a heating cycle are constituted by switching coolant passages, which include at least, the heat exchanger, a compressor 22, a heat exchanger for outdoor use and an expansion valve. The control apparatus according to the present invention is provided with a means for air conditioning mode setting 110 that sets the operating modes, including at least a heating mode, a ventilation mode and a cooling mode and that, at the same time, sets the air conditioning level in those operating modes, a means for operating mode decision making that decides whether or not the operating mode set with the means for air conditioning setting 110 has been maintained for a specific length of time, a means for compressor rotation rate setting 130 which, when it is decided by the means for operating mode decision making 120 that the operating mode that has been set by the means for air conditioning mode setting 110 has not been maintained for the specific length of time, sets the rotation rate of the compressor 22 at a specific rate, a means for compressor rotation rate calculation 140 which, if it is decided by the means for operating mode decision making 120 that the operating mode that has been set by the means for air conditioning mode setting 110 has been maintained for the specific length of time, calculates the compressor rotation rate based upon the air conditioning level set by the means for air conditioning mode setting 110, a means for operating mode switching 150 which, if it is decided by the means for operating mode decision making 120 that the operating mode set by the means for air conditioning mode setting 110 has been maintained for the specific length of time, and that the compressor rotation rate has been set at the specific rotation rate by the means for compressor rotation rate setting 130, switches to the operating mode that has been set by the means for air conditioning mode setting 110, and a means for compressor control 160, which controls the compressor 22 at the rotation rate set by the means for compressor rotation rake setting 130 or at the rotation rate calculated by the means for compressor rotation rate calculation.

Consequently, according to the present invention, a decision is made by the means for operating mode decision making 120 as to whether or not the operating mode set by the means for air conditioning mode setting 110 has been maintained for the specific length of time and the rotation rate of the compressor 22 is set at the specific rotation rate by the means for compressor rotation rate setting 130 if the operating mode has not been maintained for the specific length of time, or the compressor rotation rate is calculated by the means for compressor rotation rate calculation 140 based upon the air conditioning level set by the means for air conditioning mode setting 110 if it is decided by the means for operating mode decision making 120 that the operating mode has been maintained for the specific length of time. With this, the compressor is controlled at the rotation rate set by the means for compressor rotation rate setting 130 or at the rotation rate calculated by the means for compressor rotation rate calculation 140 and, at the same time, if it is decided by the means for operating mode decision making 120 that the operating mode has been maintained for the specific length of time and also the compressor rotation rate is set at the specific rotation rate by the means for compressor rotation rate setting 130, the operating mode is switched by the means for operating mode switching 150. As a result, the operating mode can be switched while the compressor is rotating at the specific rotation rate and switching of the operating mode can be performed smoothly, achieving the object described above.

BRIEF DESCRIPTION OF THE DRAWINGS

These and other advantages, features and objects of the present invention will be understood by those of ordinary skill in the art referring to the annexed drawings, given purely by way of non-limitative example, in which.

DETAILED DESCRIPTION OF THE PREFERRED EMBODIMENTS

The following is an explanation of an embodiment according to the present invention in reference to the drawings.

Figure 1:
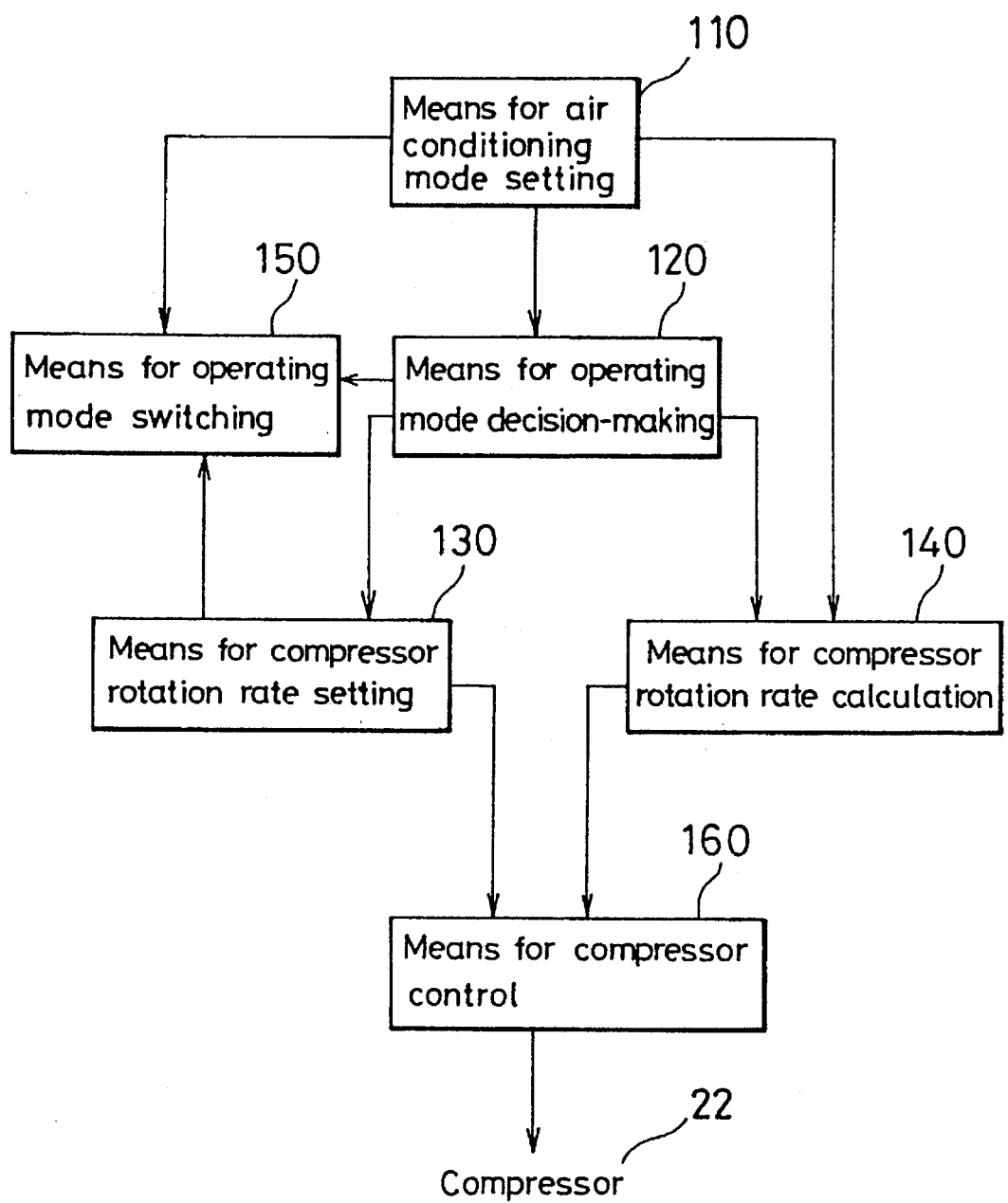
FIG. 1 is a function block diagram showing the structure of the present invention.
Figure 2:
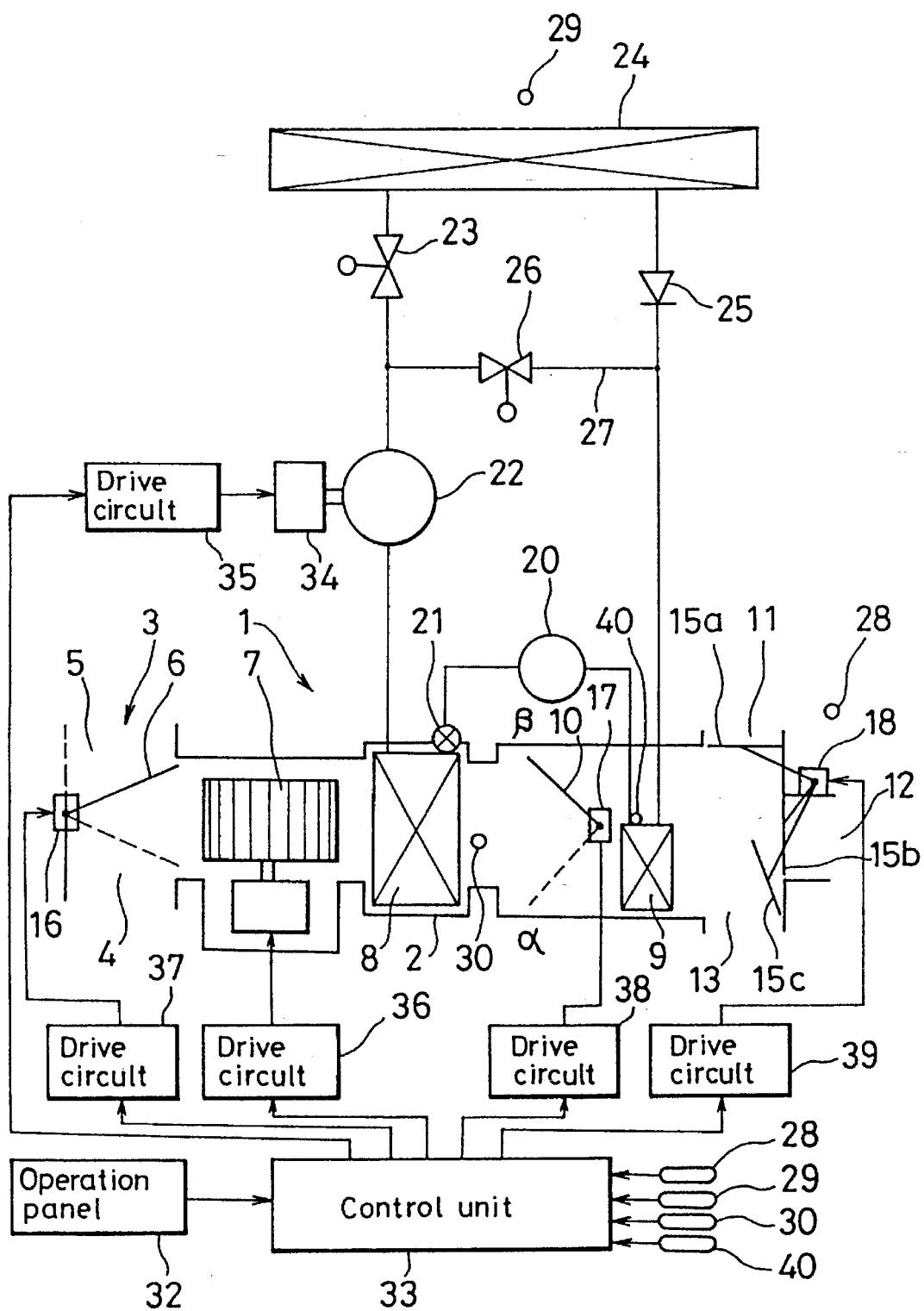
FIG. 2 is a schematic diagram which illustrates the overall design of an air conditioning system for an electric vehicle in an embodiment according to the present invention.

The air conditioning system for an electric vehicle according to the present invention shown in FIG. 2 is provided with an intake device 3 at the extreme up-stream side of an air conditioning duct 2 and the ratio of openness of the internal air intake 4 and the external air intake 5 is adjusted by an intake door 6 which is driven by an actuator 16. The air drawn in with the rotation of the fan 7 via this intake device 3 is sent to the evaporator 8 and the sub condenser 9 where heat exchange occurs. The sub condenser 9 is positioned further downstream than the evaporator 8 and the ratio of air passing through the sub condenser 9 to the air bypassing it can be varied by adjusting the openness of the mixing door 10 with the actuator 17.

Note that, with the openness at 0%, the mixing door 10 is at the position indicated with the broken line, at which the quantity of ventilation at the sub condenser at its minimum, and that, with the openness at 100%, it is at the position indicated with the solid line, at which the quantity of ventilation at the sub condenser at its maximum.

The extreme downstream side of the air conditioning duct 2 is divided into the defrost outlet 11, the ventilation outlet 12 and the heat outlet 13, to open into the cabin, and the mode doors 15a, 15b and 15c respectively are provided in the divisions. By operating these mode doors 15a 15b and 15c with the actuator 18, the outlet mode is switched among the ventilation mode, the bi-level mode and the heat mode.

The outflow side of the sub condenser 9 is connected to the inflow side of the evaporator 8 via the liquid tank 20 and the expansion valve 21 and the outflow side of the evaporator 8 is connected by piping to the intake side of the compressor 22. Also, the outlet side of the compressor 22 is connected to the inflow side of the main condenser 24 via the electromagnetic valve 23 and the outflow side of the main condenser 24 is connected to the inflow side of the sub condenser 9 via the check valve 25. In addition, between the discharge side of the compressor 22 and the outflow side of the check valve 25, a bypass passage 27, which is opened and closed with the electromagnetic valve 26 and which bypasses the main condenser 24, is connected by piping.

With this, the coolant paths can be switched between the first path, in which the coolant discharged from the compressor 22 circulates from the main condenser 24 to the check valve 25 to the sub condenser 9 to the liquid tank 20 to the expansion valve and then to the evaporator 8 in that order, and the second path in which the coolant bypasses the main condenser 24 and travels from the sub condenser 9 to the liquid tank 20 to the expansion valve 21 and then to the evaporator 8, in that order, by the open / close control of the electromagnetic valves 23, 26.

This means that, in heating control, with the electromagnetic valve 23 closed and the electromagnetic valve 26 open, the coolant travels through the second path. During this process, the high-pressure, high-temperature gaseous coolant discharged from the compressor 22 is first sent to the sub condenser 9 where it releases heat into the air passing through the sub condenser 9 and becomes liquefied, forming a high-pressure, high-temperature liquid coolant. The liquid coolant that has been separated into liquid and gas at the liquid tank 20, passes through the expansion valve 21 where it becomes a low pressure, low temperature vapor coolant. Then it absorbs heat from the air passing through the evaporator 8 to become evaporated, forming a low temperature gaseous coolant. Finally, it returns to the compressor 22. During this heat exchange, since the heat absorbed at the evaporator 8 is less than that released at the sub condenser 9 by the quantity of work done by the compressor 22, the overall temperature of the outlet air increases. With this, the heating control is executed.

Also, in cooling control, with the electromagnetic valve 23 open and the electromagnetic valve 26 closed, the coolant travels through the first path. During this process, the high-pressure, high-temperature gaseous coolant discharged from the compressor 22 flows through the main condenser 24 to reach the sub condenser 9 and since most of the gaseous coolant becomes liquefied after releasing its heat at the main condenser 24, the temperature at the sub condenser 9 is lower compared with during the heating operation explained earlier. However, since the temperature at the sub condenser 9 is much higher than the temperature at the evaporator 8, during cooling control, the mixing door 10 is basically kept in the fully closed state and the sub condenser 9 is not used, and the temperature of the discharged air is adjusted by controlling the discharge temperature from the evaporator 8 through compressor control. With this, because the air cooled while passing through the evaporator 8 bypasses the sub condenser 9, cooled air is discharged into the cabin and thus cooling control is performed. Furthermore, when subtle temperature control is required, for example, when performing temperature control after the temperature in the cabin has reached the specific level, the discharge temperature can be fine tuned by opening / closing the mixing door 10.

In order to control the air conditioning system 1 that is structured as has been described, a control unit 33 is provided. This control unit 33 comprises a central processing unit (CPU), a read only memory (ROM), a random access memory (RAM), an input / output port (I/O) which are not shown in the figure. The output signal from the operation panel 32 that sets the operating mode of the air conditioning system 1 and sets the air conditioning level, as well as output signals from the sensors 28, 29, 30 and 40, which are to be explained later, are input to the control unit 33 which then processes the various signals based upon a specific program. It outputs control signals to the drive motor 34 for the compressor 22, the motor for the fan 7 and the actuators 16, 17 and 18 via the drive circuits 35, 36, 37, 38 and 39 to control the outlet capacity of the compressor 22, the rotation rate of the fan 7, the degree of openness of the mixing door 10, and switching between the intake and outlet modes. Note that reference number 28 indicates an indoor temperature sensor which detects the temperature inside the cabin, reference number 29 indicates an outdoor temperature sensor that detects temperature of the outside air, reference number 30 indicates an evaporator temperature sensor that detects the discharge air temperature immediately after passing though the evaporator 8 and reference number 40 indicates a temperature sensor that is mounted in the piping on the coolant outlet side of the sub condenser 9 to detect either the temperature of the coolant that has passed through the sub condenser 9 or the discharge air temperature immediately after passing though the sub condenser 9.

Figure 3A:
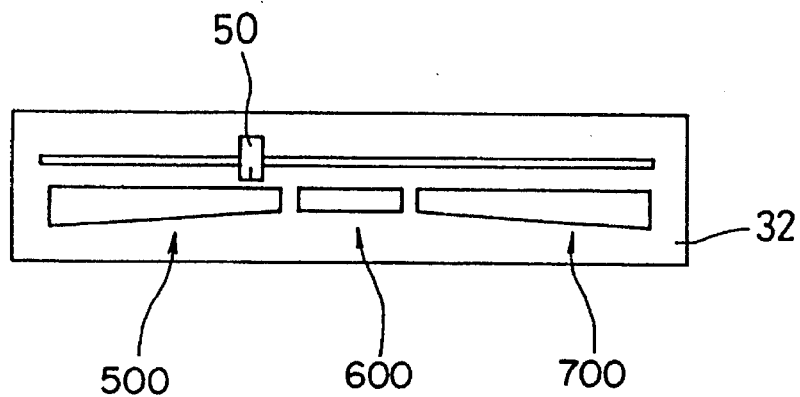
FIG. 3A shows a temperature control lever provided on the operation panel.
Figure 3B:
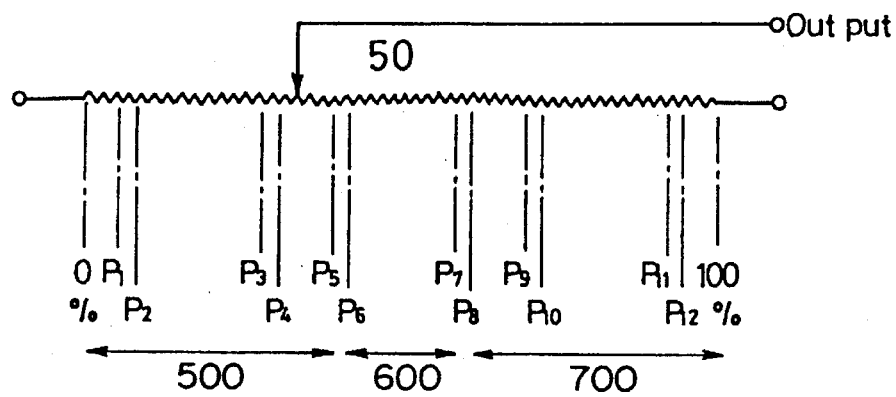
FIG. 3B shows the distribution ratio of the electric circuit of the slide switch constituting the temperature control lever and the temperature lever itself.
Figure 3C:
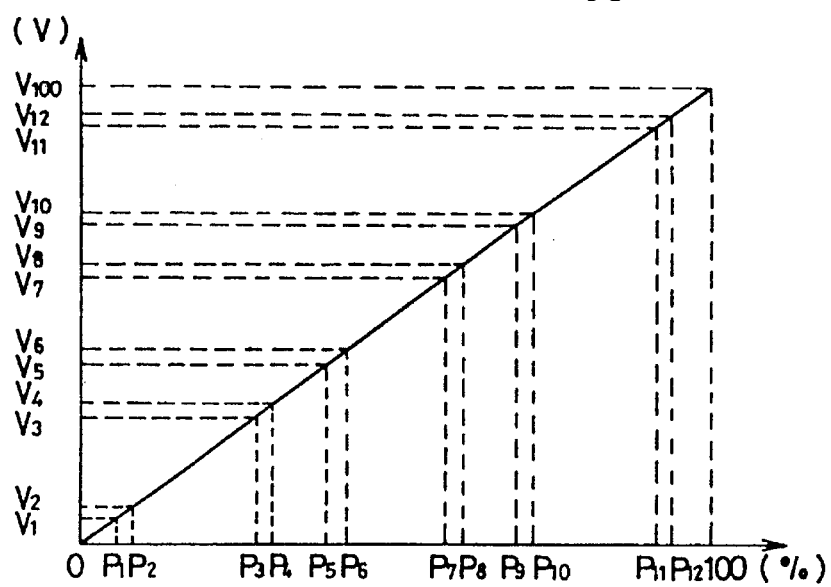
FIG. 3C is a characteristics diagram illustrating the relationship between the distribution ratio of the temperature control lever and the output.

The operation panel 32 may have a structure as shown in FIG. 3A, for example, in which the operating mode and the air conditioning level can be set by moving the temperature control lever 50, constituted of a slide switch, to specific positions. To give more detail; the cooling operation zone (cooling mode) 500 and the heating operation zone (heating mode) 700 are arranged on opposite sides of the ventilation operation zone (ventilation mode) 600 within the range through which the temperature control lever 50 (slide switch) moves. As the temperature control lever 50 approaches either end, the air conditioning level increases. Note that the output voltage of the slide switch is (0 to $V_{100}$), which corresponds to the position of the temperature control lever 50 (0 to 100%) as shown in FIGS. 3B and 3C and a voltage ($V_1$ to $V_{12}$) which corresponds to the position of the temperature control lever 50 ($P_1$ to $P_{12}$) explained below is output.

Figure 4:
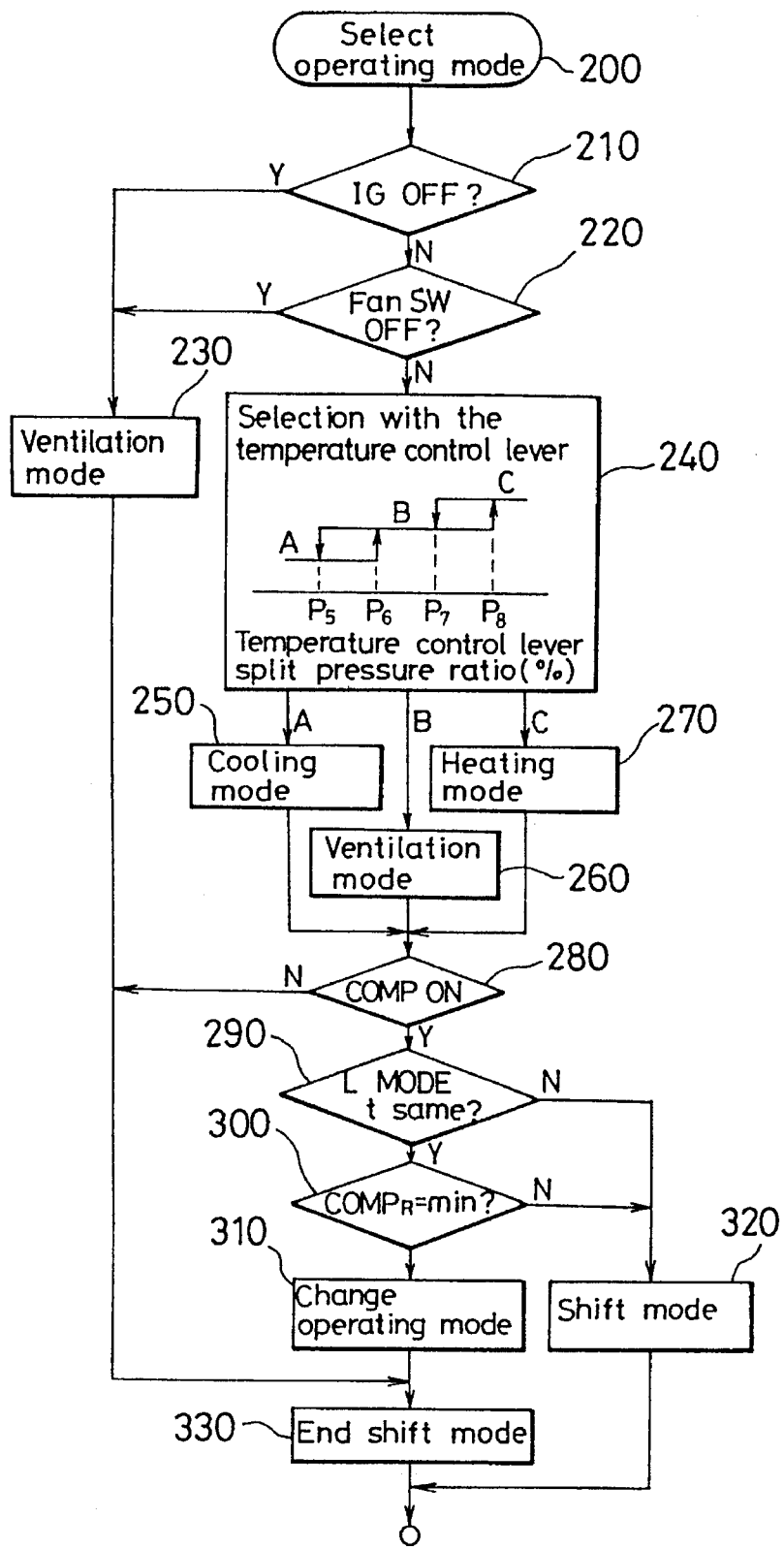
FIG. 4 is a flow chart of the operating mode selection control routine in an embodiment according to the present invention.

The following is the explanation of an example control operation performed by the control unit 33 in reference to the flow chart in FIG. 4, in which the operating mode selection control is detailed.

The operating mode selection control routine, which starts at step 200, is part of the main control routine in the air conditioning control whereby the air conditioning system 1 is controlled. It is executed at a jump instruction or a timer interrupt, which are described in the relevant steps in the main control routine.

In this operating mode selection control routine, first, in step 210, a decision is made as to whether or not the ignition switch (IG) (not shown in the figure), is on (IG OFF?). If it is off (Y), the operation proceeds to step 230, in which the ventilation mode is set. On the other hand, if the ignition switch is on (N), the operation proceeds to step 220, in which a decision is made as to whether or not the fan switch (FAN SW) (not shown) is on, (FAN SW OFF?). If the fan switch is off (Y), the operation proceeds to step 230, in which, in a similar manner, the ventilation mode is set.

If it is decided in the decision making in steps 210 and 220 that the ignition switch is on (N) and that the fan switch is on (N), the operation proceeds to step 240, in which the operating mode is determined based upon the position of the temperature control lever 50 (temperature lever divided potential ratio). In the decision making based upon this temperature control lever divided potential ratio, a hysteresis is formed between $P_5$ and $P_6$ when a selection is made with the decision A and decision B, and a hysteresis is formed between $P_7$ and $P_8$ when a selection is made with the decision B and decision C. Because of this, as shown in FIG. 3B, when shifting from the decision B to the decision A, the shifting occurs at $P_5$ (43%, for instance) and when shifting from the decision A to the decision B, the shifting occurs at $P_6$ (44%, for instance). Likewise, when shifting from the decision B to the decision C, the shifting occurs at $P_8$ (57%, for instance) and when shifting from the decision C to the decision B, the shifting occurs at $P_7$ (56%, for instance).

If the decision A is selected based upon the position of the temperature control lever 50 in step 240, the operation proceeds to step 250, in which the cooling mode is set. Also, if the decision B is selected in the decision making in step 240, the operation proceeds to step 260, in which the ventilation mode is set. If the decision C is set, the operation proceeds to step 270, in which the heating mode is set. After setting the operating mode in this manner, a decision in regard to the operating state of the compressor 22 (COMP ON) is made in step 280. In this decision making, if the compressor 22 is operating (Y), the operation proceeds to step 290, and if, on the other hand, the compressor 22 is not operating (N), the operation proceeds to step 330, in which the end of the shift mode, which is to be explained below, is set.

In step 290, a decision is made as to whether or not the operating mode ($L_{MODE}$) that has been set earlier, in step 240, has been maintained for the specific length of time t (2 seconds, for example). In this decision making, if the operating mode ($L_{MODE}$) has remained the same for the specific length of time t (Y), the operation proceeds to step 300, in which a decision is made as to whether or not the actual compressor rotation rate ($COMP_R$) is at the minimum rotation rate ($COMP_R$=min?). If it is decided in step 300 that the actual compressor rotation rate ($COMP_R$) is at the minimum rotation rate (min), the operation proceeds to step 310, in which the operating mode is switched to the mode set in step 240. Then in step 330, the end of the shift mode is set before the operation returns to the main control routine.

Also, if it is decided in step 290 that the same operating mode ($L_{MODE}$) has not been maintained for the specific length of time t, or if, although it is decided in step 290 that the operating mode ($L_{MODE}$) has been maintained for the specific length of time, it is decided in step 300 that the actual compressor rotation rate ($COMP_R$) is not at the minimum rotation rate (min), the operation proceeds to step 320, in which the shift mode is set, and then the operation returns to the main control routine.

If it is decided in step 300 that the compressor rotation rate is not at the minimum rotation rate, the compressor rotation rate can be set at the minimum rotation rate in step 470, which is to be explained later, by setting the shift mode. As a result, the pressure of the coolant passing through the electromagnetic valves 23, 26 while the operating mode is switched from the heating mode to the cooling mode or from the cooling mode to the heating mode, can be reduced, thereby reducing the impact noise of the electromagnetic valves.

Figure 5:
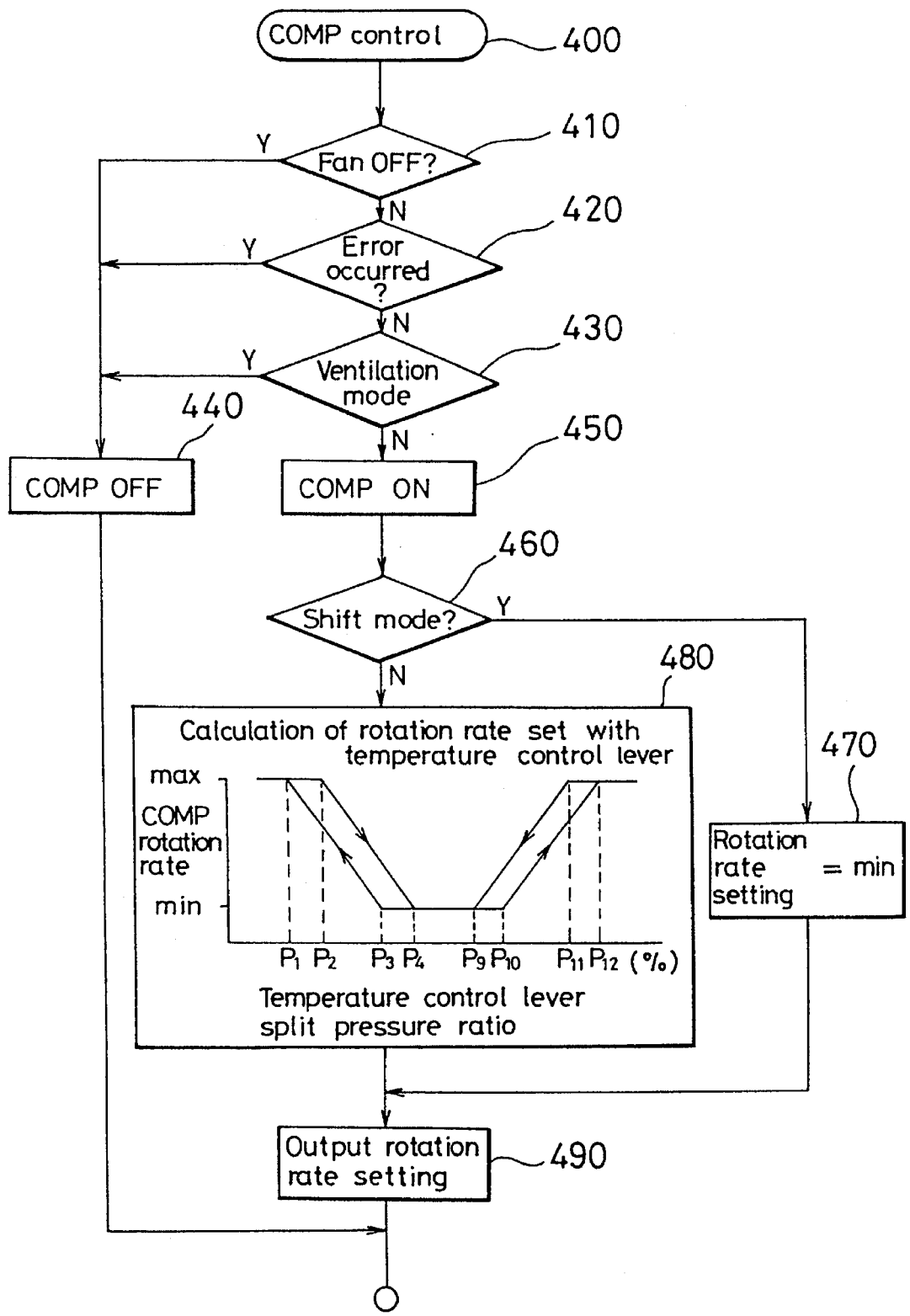
FIG. 5 is a flow chart of the compressor control routine in an embodiment according to the present invention.

The execution of the compressor control routine shown in FIG. 5 starts in step 400 on a jump command or a timer interrupt from the main control routine, as in the case of the operating mode selection control routine described above. In step 410, a decision is made in regard to the operating state of the fan (FAN OFF?) If the fan is operating (N), the operation proceeds to step 420, in which a decision is made as to whether or not an error has occurred. If no error has occurred (N), the operation proceeds to step 430, in which a decision is made as to whether or not the ventilation mode has been set in the operating mode selection control routine described above.

If it is decided in the decision making in steps 410, 420 and 430 that the fan 7 is not operating, that an error has occurred or that the operating mode is set to the ventilation mode, the operation proceeds to step 440, in which the operation of the compressor 22 is stopped (COMP OFF). If, on the other hand, the fan is operating, there is no error and the operating mode is not set to the ventilation mode, the operation proceeds to step 450, in which the operation of the compressor starts (COMP ON).

After that, in step 460, a decision is made as to whether or not the shift mode has been set (SHIFT MODE?) in the operating mode selection control routine explained earlier. If it is decided that the shift mode has been set (Y), the rotation rate setting for the compressor is set at the minimum rotation rate (min) in step 470. If, on the other hand, it is decided in step 460 that the shift mode has not been set (N), the operation proceeds to step 480.

In step 480, the rotation rate setting for the compressor is calculated based upon the characteristics curve shown in the box in step 480, for instance. To be more specific, when the temperature control lever 50 is shifted in the direction in which the air conditioning level is increased in the cooling mode, in other words, when the temperature control lever divided potential ratio changes from $P_3$ (32%, for example) to $P_1$ (5%, for example), the compressor rotation rate is calculated in conformance with the characteristics curve in such a manner that the compressor rotation rate changes linearly from the minimum rotation rate (min) to the maximum rotation rate (max). In contrast, when the temperature control lever 50 is shifted in the direction in which the air conditioning level is decreased, in other words, when the temperature control lever divided potential ratio changes from $P_2$ (6%, for example) to $P_4$ (33%, for example), the compressor rotation rate is calculated in conformance with the characteristics in such a manner that the compressor rotation rate changes linearly from the maximum rotation rate (max) to the minimum rotation rate (min). Likewise, in the heating mode, when the temperature control lever divided potential ratio changes from $P_{10}$ (68%, for example) to $P_{12}$ (95%, for example), the compressor rotation rate is calculated in conformance with the characteristics curve in such a manner that the compressor rotation rate changes linearly from the minimum rotation rate (min) to the maximum rotation rate (max) and when the temperature control lever divided potential ratio changes from $P_{11}$ (94%, for example) to $P_9$ (67%, for example), the compressor rotation rate is calculated in conformance with the characteristics whereby the compressor rotation rate changes linearly from the maximum rotation rate (max) to the minimum rotation rate (min).

After this, in step 490, the compressor rotation rate that was calculated in step 480 or the rotation rate setting that was set in step 470 is output to the drive circuit 35, which drives the compressor 22 to control the compressor 22.

As has been explained so far, in this control, when the temperature control lever 50 is moved from the cooling mode to the heating mode or from the heating mode to the cooling mode, the temperature control lever 50 passes through the ventilation mode (ventilation operation zone) in which the operation of the compressor 22 would normally be stopped. At this point, although the ventilation mode is briefly set as the operating mode, this operating mode is not maintained for the specific length of time and, as a result, the shift mode is set (step 320). Since, when the shift mode is set, the rotation rate of the compressor is set at the minimum rotation rate (min) (step 470), stoppage of the compressor in the ventilation mode which is only temporarily set when the temperature control lever 50 passes through the ventilation mode can be avoided. With this, switching from the cooling mode to the heating mode or from the heating mode to the cooling mode can be performed smoothly.

In addition, only when the operating mode set with the temperature control lever at a specific position, has been maintained for the specific length of time and, at the same time, the actual rotation rate of the compressor 22 is at the minimum rotation rate, the various air conditioning control devices are switched to the operating mode set with the temperature control lever 50 (step 310). With this, when the operating mode is set to the cooling mode, the cooling / heating cycle is set to the cooling cycle, the intake air mode is set to a specific internal / external air mixing mode and the outlet air mode is set to the ventilation mode, for instance. If, on the other hand, the operating mode is set to the heating mode, the cooling heating cycle is set to the heating cycle, the intake air mode is set to internal air circulation mode or to a specific internal / external air mixing mode and the outlet air mode is set to the heat mode.

Furthermore, if the operating mode set with the temperature control lever 50 is the ventilation mode, following the decision making in step 430, the operation proceeds to step 440, in which the compressor 22 is turned off.

Note that, although in this embodiment a temperature control lever constituted with a slide switch is employed as the means for air conditioning mode setting the temperature control lever divided potential ratio is used as the operating mode switching factor and the air conditioning level setting factor, an integrated signal constituted of a heat load signal, which is calculated using at least the cabin internal temperature, the external temperature, the quantity of solar radiation and the temperature setting, or a target outlet temperature, may be used instead of the operating mode switching factor and the air conditioning level setting factor on the temperature control lever. In that case, based upon the integrated signal or the target outlet temperature, by using a map established through experiment or a specific function, the operating mode and the air conditioning level can be set. Also, in this embodiment, the means for the air conditioning mode setting switches the operating mode and also sets the air conditioning level, but this single means for air conditioning mode setting may be divided into two separate means; one for operating mode setting, which sets the operating mode (a mode setting switch, for example) and the other for air conditioning level setting, which sets the air conditioning level in the operating mode (a temperature setting switch, for example). Furthermore, similar advantages can be achieved if a so-called heat pump type air conditioning system is used instead of the one described above. The heat pump type air conditioning system as referred to here uses a heat exchanger for outdoor use for a condenser, a heat exchanger provided inside the air conditioning duct for an evaporator in the cooling cycle. In the heating cycle, it uses a heat exchanger for outdoor use for an evaporator, a heat exchanger provided inside the air conditioning duct for a condenser to cool or heat the air passing through the air conditioning duct.

As has been explained so far, according to the present invention, when the operating mode has been switched, the shift mode is set, the compressor rotation rate is set at the minimum rotation rate and the operating mode is not actually switched until the actual compressor rotation rate is at the minimum rotation rate. As a result, the impact noise of the electromagnetic valves is prevented when switching the operating mode and, at the same time, the operating mode can be switched without turning off the compressor. This affords a more gentle change in state of the cooling / heating cycle and changes in the air conditioning control can be made smoother.

What is claimed is;

1. A control apparatus for an air conditioning system for an electric vehicle which is provided with a heat exchanger inside an air conditioning duct, wherein;

a cooling cycle and a heating cycle are constituted by switching coolant passages, which include, at least, said heat exchanger, a compressor, a heat exchanger for outdoor use and an expansion valve, and a means for air conditioning mode setting which sets operating modes including, at least, a heating mode, a ventilation mode and a cooling mode and sets an air conditioning level in said operating modes, a means for operating mode decision making which decides whether or not an operating mode set with said means for air conditioning mode setting has been maintained for a specific length of time, a means for compressor rotation rate setting which, if it is decided by means for operating mode decision making that said operating mode set by said means for air conditioning mode setting has not been maintained for said specific length of time, sets the rotation rate of said compressor at a specific rate, a means for compressor rotation rate calculation which, if it is decided by said means for operating mode decision making that the operating mode set by said means for air conditioning mode setting has not been maintained for a specific length of time, calculates a compressor rotation rate based upon said air conditioning level set by said means for air conditioning mode setting, a means for operating mode switching which, if it is decided by said means for operating mode decision making that said operating mode set by said means for air conditioning mode setting has been maintained for said specific length of time, and if, at the same time, said compressor rotation rate has been set at said specific rotation rate by said means for compressor rotation rate setting, switches to the operating mode that has been set by said means for air conditioning mode setting, and a means for compressor control, which controls said compressor at either the rotation rate set by said means for compressor rotation rate setting or the rotation rate calculated by said means for compressor rotation rate calculation.

2. A control apparatus for an air conditioning system for an electric vehicle according to claim 1, wherein;

said heat exchanger for outdoor use is a condenser, said heat exchanger provided inside said air conditioning duct is constituted of an evaporator and a sub condenser, a mixing door which adjusts the flow rate of air flowing to said sub condenser is provided on the upstream side of said sub condenser, and a cooling cycle is constituted in said cooling mode, wherein said compressor, said condenser, said sub condenser, said expansion valve and said evaporator are connected in series, and a heating cycle is constituted in said heating mode, wherein said condenser is bypassed and said compressor, said sub condenser, said expansion valve and said evaporator are connected in series.

3. A control apparatus for an air conditioning system for an electric vehicle according to claim 2 wherein;

said means for air conditioning mode setting is a temperature control lever constituted with a slide switch whereby said cooling mode, the ventilation mode and said heating mode are set based upon the divided potential ratio on said temperature control lever.

4. A control apparatus for an air conditioning system for an electric vehicle according to claim 2 wherein;

said means for air conditioning mode setting uses an integrated signal consisting of a heat load signal calculated from, at least, the cabin internal temperature, the external air temperature, the quantity of solar radiation and the temperature setting, or, alternatively, uses a target discharge temperature as a basis upon which said operating mode and said air conditioning level are set.

5. A control apparatus for an air conditioning system for an electric vehicle according to claim 2 wherein;

said means for air conditioning mode setting comprises;

a means for operating mode setting that sets said operating mode, and a means for air conditioning level setting that sets said air conditioning level.

6. A control apparatus for an air conditioning system for an electric vehicle according to claim 5 wherein;

said means for operating mode setting is a mode setting switch and said means for air conditioning level setting is a temperature setting switch.

7. A control apparatus for an air conditioning system for an electric vehicle according to claim 1 wherein;

in said cooling mode, said heat exchanger for outdoor use is used for a condenser and said heat exchanger inside said air conditioning duct is used for an evaporator and, in said heating mode, said heat exchanger for outdoor use is used for an evaporator and said heat exchanger inside said air conditioning duct is used for a condenser.

8. A control apparatus for an air conditioning system for an electric vehicle according to claim 7 wherein;

said means for air conditioning mode setting is a temperature control lever constituted with a slide switch whereby said cooling mode, the ventilation mode and said heating mode are set based upon the divided potential ratio on said temperature control lever.

9. A control apparatus for an air conditioning system for an electric vehicle according to claim 7 wherein;

said means for air conditioning mode setting uses an integrated signal consisting of a heat load signal calculated from, at least, the cabin internal temperature, the external air temperature, the quantity of solar radiation and the temperature setting, or, alternatively, uses a target discharge temperature as a basis upon which said operating mode and said air conditioning level are set.

10. A control apparatus for an air conditioning system for an electric vehicle according to claim 7 wherein;

said means for air conditioning mode setting comprises;

a means for operating mode setting that sets said operating mode, and a means for air conditioning level setting that sets said air conditioning level.

11. A control apparatus for an air conditioning system for an electric vehicle according to claim 10 wherein;

said means for operating mode setting is a mode setting switch and said means for air conditioning level setting is a temperature setting switch.

12. A control apparatus for an air conditioning system for an electric vehicle according to claim 1 wherein;

said means for air conditioning mode setting is a temperature control lever constituted with a slide switch whereby said cooling mode, the ventilation mode and said heating mode are set based upon the divided potential ratio on said temperature control lever.

13. A control apparatus for an air conditioning system for an electric vehicle according to claim 1 wherein;

said means for air conditioning mode setting uses an integrated signal consisting of a heat load signal calculated from, at least, the cabin internal temperature, the external air temperature, the quantity of solar radiation and the temperature setting, or, alternatively, uses a target discharge temperature as a basis upon which said operating mode and said air conditioning level are set.

14. A control apparatus for an air conditioning system for an electric vehicle according to claim 1 wherein;

said means for air conditioning mode setting comprises;

a means for operating mode setting that sets said operating mode, and a means for air conditioning level setting that sets said air conditioning level.

15. A control apparatus for an air conditioning system for an electric vehicle according to claim 14 wherein;

said means for operating mode setting is a mode setting switch and said means for air conditioning level setting is a temperature setting switch.

* * * * *